United States Patent [19]

Okabe et al.

[11] Patent Number: 4,818,588
[45] Date of Patent: Apr. 4, 1989

[54] PACKAGING MATERIALS

[75] Inventors: Mitsuo Okabe, Yokohama; Hirohito Tomita; Shoichi Kubo, both of Tokyo, all of Japan

[73] Assignee: Dai Nippon Insatsu Kabushiki Kaisha, Tokyo, Japan

[21] Appl. No.: 931,863

[22] Filed: Nov. 18, 1986

[30] Foreign Application Priority Data

Nov. 20, 1985 [JP] Japan .................. 60-260863
Mar. 24, 1986 [JP] Japan .................. 61-65482
Mar. 27, 1986 [JP] Japan .................. 61-45357[U]
May 23, 1986 [JP] Japan .................. 61-11857

[51] Int. Cl.⁴ .................. B32B 3/10; B32B 5/16; B32B 15/08
[52] U.S. Cl. .................. 428/201; 428/2.4; 428/2.5; 428/2.9; 428/457; 428/461; 428/492; 428/520; 428/913

[58] Field of Search .................. 428/516, 520, 461, 35, 428/201, 347, 209, 204, 457, 205, 492, 913; 429/167

[56] References Cited

U.S. PATENT DOCUMENTS 4,161,562 7/1979 Yoshikawa et al. .................. 428/520
4,608,284 8/1986 Roales .................. 428/516 X
4,608,323 8/1986 Zaborney .................. 429/167

Primary Examiner—Thomas J. Herbert
Attorney, Agent, or Firm—Parkhurst, Oliff & Berridge

[57] ABSTRACT

A packaging material comprising an outer layer of a heat shrinkable plastic film and a metallic glossy laminate which is disposed on the inner side of said outer layer and which maintains metallic gloss even after heat shrinkage. A heat shrunk package having beautiful metallic gloss can be obtained by the use of this packaging material.

9 Claims, 1 Drawing Sheet

PACKAGING MATERIALS

BACKGROUND OF THE INVENTION

This invention relates to a packaging material which has good metallic gloss or luster, which is capable of undergoing heat shrinkage, and which is suitable for use as outer jackets or housings for products such as shampoos, rinses, cosmetics, and dry cells.

Shrink packaging by means of a package material in the form of a heat shrinkable plastic film has been widely used in packaging of the barrel part or the entire body of glass and plastic bottles for shampoos, rinses, cosmetics and the like; in packaging of audio products such as video tapes, and cassette tapes; in packaging of dry cells and drinks; and in packaging of confectioneries and boxes of confectioneries. However, when a packaging material comprising a shrinkable plastic film provided with a metal layer, e.g., a metal-deposited layer is used and shrunk, the metal-deposited layer cannot accommodate to the shrinkage of the plastic film. Thus, cracks are generated in the metal-deposited layer, its metallic gloss is lost, and blushing can occur. Accordingly, a metal-deposited layer cannot be used in shrink packaging. In order to develop metallic gloss, a process wherein an ink layer having metallic gloss is used to develop metallic gloss has been used. However, in the case of mere application of metal ink compositions, such ink compositions have intrinsically low metallic gloss and therefore insufficient metallic gloss is obtained.

In packaging of particular products such as video tapes and cassette tapes, a metal-deposited layer has been currently proposed in shrink packaging. In this case, the metal-deposited layer is used at a face region exhibiting little shrinkage so that the metal-deposited layer is not affected by shrinkage.

In such a case, metal cannot be deposited onto the entire packaging material. Further, its exterior appearance and visual impression are poor. Furthermore, it is necessary to carry out complicated steps such as paster and sealant processing. Accordingly, there are many difficulties in the steps for producing a packaging material and in shrinking steps.

Recently, there has appeared a product wherein a packaging material having a shrinkable plastic film provided with a metal-deposited layer is shrunk onto the barrel portion of tubular plastic bottles for shampoos, rinses and the like. In this case, in order to prevent blushing due to wrinkles and cracks of the deposited layer of the name portion of the front, a method wherein only the back and side portions are shrunk and the front is subjected to minimal shrinkage is adopted.

In such a case, in order to limit the portions which are to be shrunk, it is necessary to amply align the packaging material prior to shrinking. Further, the packaging material cannot be easily passed through a heat open tunnel and therefore it is not partially shrunk. Furthermore, it is extremely difficult to control the hot air used in the heat open tunnel.

An object of the present invention is to provide a packaging material which is capable of undergoing heat shrinkage and which has good metallic gloss after heat shrinkage.

This and other objects of the present invention will become apparent from the description presented hereinafter.

SUMMARY OF THE INVENTION

According to the present invention, there is provided a packaging material comprising an outer layer of a heat shrinkable plastic film, and a metallic glossy laminate which is disposed on the inner side of this outer layer and which maintains metallic gloss after heat shrinkage.

A packaging material constituting an embodiment of the present invention comprises: an outer layer of a heat shrinkable plastic film; an anti-blushing primer layer disposed on the inner side of the film, preferably an anti-blushing primer layer comprising a bilayer structure of the same or different rubber primers; and a metal layer, preferably a metal-deposited layer disposed on the inner surface of the primer layer. A printed ink layer can be optionally interposed between the heat shrinkable plastic film and the anti-blushing primer layer.

In this embodiment of the invention, a heat bonding resin layer can be disposed on the inner side of the metal layer.

In this embodiment of the invention, a heat shrinkable plastic film may be disposed on the inner side of the metal layer via an adhesive layer.

In this mode of practice, an insulating paint film can be disposed on the inner surface of the metal layer.

A packaging material constituting another embodiment of the present invention comprises an outer layer of a heat shrinkable plastic film, an ink layer disposed on the inner surface of said film, and an insulating inner layer disposed thereon.

In this embodiment of the invention, a metal-deposited layer can be interposed between said outer layer and said inner layer.

In this mode of practice, said inner layer can be composed of a resin paint film.

In this mode of practice, said inner layer can be composed of a heat shrinkable plastic film.

A packaging material constituting a further embodiment of the present invention is one wherein said metallic glossy laminate comprises a metal layer partially formed on the inside of said film, and a protective layer of an acid- or alkali-resistant ink composition formed by coating the inner surface of said metal layer therewith.

The following advantages are achieved by the above mentioned various embodiments of the present invention.

The generation of cracks of the metal layer during heat shrinkage is prevented by the anti-blushing primer layer according to one embodiment of the present invention, and a heat-shrunk package having a beautiful metallic gloss can be obtained.

When the packaging material of the present invention is applied to dry cell jackets, the following advantages and effects are obtained in addition to the advantage described above by the present packaging material.

(a) With the utilization of a heat shrunk tubing, the dry cell jacket can be made exceedingly thin, thereby permitting an increase in the amount of active dry cell components in standardized dry cell sizes. Thus, the capacity of the dry cell can be improved.

(b) Because an inexpensive plastic film is used as a substrate, the production cost of the dry cell can be further reduced.

(c) Because the printed layer is protected by the plastic film outer layer, scumming or tinting of a pattern is minimized.

(d) Because the insulating material can be also used to form the inner layer of the packaging material, short circuiting of the dry cell can be prevented. Further, it is possible to protect the metal-deposited layer from an electrolytic solution which is liable to contact the metal-deposited layer during the dry cell production steps.

In one embodiment of the present invention, large curling can be prevented by providing a metal layer partially formed on the inner side of the heat shrinkable plastic film, and a protective layer of an acid or alkali resistant ink composition formed by coating the inner surface of said metal layer therewith. As a result, when a product is packaged with the heat shrinkable packaging material, the package reject rate is extremely small as compared with that in the case wherein packaging is carried out by using a prior art wrapping film. Thus, product packaging can be efficiently carried out while maintaining a beautiful metallic gloss.

DETAILED DESCRIPTION

Figure 1:
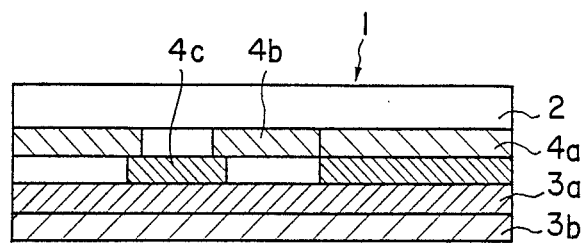
FIGS. 1, 2, 3 and 4 are schematic sectional views of materials obtained respectively in Examples 1, 2, 3 and 4 set forth hereinafter.

The present invention will now be described in detail.

Anti-blushing primers which can be used in the present invention include rubber primers. Examples of the rubber primers are primers of materials such as natural rubbers, chlorinated rubbers, rubber hydrochlorides, cyclized rubbers, fluororubbers, rubber oxides, thiocyanogen rubbers, and rubbers based on graft and block copolymers.

In the present invention, the anti-blushing primer layer comprises preferably a bilayer structure of rubber primers. It is desirable to appropriately vary these two layers according to the type of other layers with which each layer comes in contact. For example, when the anti-blushing primer layer is interposed between a printed ink layer and an aluminum metal-deposited layer, it is suitable that a chlorinated rubber primer be disposed on the side of the aluminum metal-deposited layer and that a cyclized rubber primer be disposed on the side of the printed ink layer.

The thickness of the anti-blushing layer can appropriately vary depending upon the type of the primers, application methods, the type of other laminating materials and other factors. For example, when the layer thickness of each layer is from 0.5 to 2 g/m², gravure coating is readily carried out. While the preferred methods of forming the anti-blushing primer are gravure coating and the like, methods which can be used in the present invention are not limited thereto. The reason why the gravure coating is preferred is as follows. It is desirable that both the printed ink layer and the primer layer be the same gravure coat because they are coated on the heat shrinkable plastic film.

It is believed that, in heat shrinking the packaging material of this embodiment of the invention, the anti-blushing primer layer acts as a buffer which absorbs stress caused by heat shrinkage, and thus the anti-blushing primer layer prevents the generation of wrinkles and cracks of the metal layer. When the anti-blushing primer layer is composed of a multi-layer structure, particularly a bilayer structure consisting of an outer cyclized rubber primer layer and an inner chlorinated rubber primer layer, a remarkable anti-blushing effect is obtained While the mechanism is not entirely apparent, the stress caused by heat shrinkage can be gradually relaxed by sequentially laminating the chlorinated rubber primer layer and the cyclized rubber primer layer. It is also believed that a slippage occurs between the two primer layers due to stress relaxation. It is believed that the chlorinated rubber primer layer/cyclized primer layer laminate described above is the best combination from the standpoints of the flexibility, stiffness, and heat deformability of the primer layer. This description is given for better understanding of the present invention and is not intended to limit the scope of the present invention.

Examples of the heat shrinkable plastic films which can be used in the present invention are a single-layer film (a simple substance or a composite, i.e., a coextruded film and the like), and a laminate, of materials such as polyvinyl chloride (PVC), polyethylene (PE), polypropylene (PP), polyethylene terephthalate (PET), nylons (NY), polystyrene (PS), polyvinylidene chloride, ethylene-vinyl acetate copolymers, and straight chain low density polyethylene. The plastic film can be subjected to treatment such as monoaxial stretching in order to enhance its heat shrinkability.

It is desirable that the thickness of the heat shrinkable plastic film be determined by varying it appropriately depending upon the uses of the packaging material and the strength of other layers. For example, from the standpoint of strength, it is necessary that the thickness of the heat shrinkable plastic film be at least 30 μm. If the thickness of the heat shrinkable plastic film is more than 100 μm, its cost tends to increase. The thickness of the heat shrinkable plastic film is appropriately selected depending upon the size of the body to be packaged. The percent shrinkage of the heat shrinkable plastic film is, for example, from 0 to 30% in the longitudinal direction and from 15 to 60% in the lateral direction.

Ink compositions optionally disposed on the inner surface of the heat shrinkable plastic film which is an outer layer are those obtained by adding coloring agents such as pigments and dyes, plasticizers, stabilizers, other additives, solvents, and diluents into a vehicle. Examples of vehicles which can be used in the present invention are: cellulose derivatives such as ethyl cellulose, nitrocellulose (nitrocotton) ethyl hydroxycellulose, cellulose acetate propionate, and cellulose acetate; styrene resins and styrene copolymer resins such as polystyrene and poly α-methylstyrene; homopolymer and copolymer resins of acrylic or methacrylic resins such as polymethyl methacrylate, polyethyl methacrylate, polyethyl acrylate and polybutyl acrylate; rosin ester resins such as rosin, rosin-modified maleic acid resins, rosin-modified phenolic resins and polymerized rosins; polyvinyl acetate resins, coumarone-indene resins, vinyltoluene resins, vinyl chloride resins, vinyl chloride-vinyl acetate copolymers, polyester resins, polyurethane resins (containing polyurethane+nitrocellulose and the like), butyral resins, and mixtures thereof.

So-called silver ink and gold ink can be used in order to impart metallic gloss to the surface of the package.

Ink compositions which can be used in the present invention are selected by considering the printability of the ink composition relative to the materials to be printed, adhesion properties and the like. For example, when the heat shrinkable film is polyvinyl chloride, rubber, acryl or vinyl chloride-based ink compositions can be used.

In the present invention, processes of applying desired letters and patterns to the inner surface of the plastic film with the ink composition, i.e., printing processes may be conventional processes such as gravure printing, offset printing, silk screen printing, offset gravure printing, electrostatic printing, and jet printing. Processes for forming the anti-blushing primer are the same printing processes as those used in applying the ink compositions.

The metal layer can be provided by forming a desired metal film onto the surface of the anti-blushing primer layer and the like by means of vacuum deposition, sputtering, ion plating or the like. Metals used in such processes are not restricted, and various metals can be used. Examples of such metals are gold, silver, copper, platinum, lead, zinc, cadmium, nickel, cobalt, tin, aluminum, magnesium, titanium, beryllium, lithium, gallium, selenium, tellurium, chromium, manganese, antimony, and bismuth.

If necessary, the metal may be partially deposited by carrying out a sealant processing wherein a depositing anchor and a sealant primer are applied to predetermined portions of the surface to be deposited, a metal film is formed on this treated surface by means of vacuum deposition and then the laminate is washed with water to peel off the deposited film present in the sealant primer-coated portions.

The thickness of the metal layer is, for example from 100 to 900 Å, preferably from 300 to 600 Å. If the thickness is less than the lower limit described above, metal sheen properties are insufficient. If the thickness is mor than the upper limit described above, wrinkles and cracks are liable to occur during high shrinkage.

In a preferred embodiment of the present invention, a heat bonding resin layer can be disposed on the inner side of the metal layer.

This heat bonding resin (hot melt adhesive) has a melting point of from 60° to 120° C. It adheres intimately to the contents to be packaged, for example the outer wall of a dry cell body during heat shrinkage. When the heat bonding resin is used in the packaging of a dry cell, it has an electrical resistance value of from $10^4$ to infinity $\infty$ (ohm). Examples of heat bonding resins which can be used in the present invention are rosins such as gum rosin, wood rosin and tall oil resin, shellac, copal, polyvinyl chloride, vinyl chloride-vinyl acetate copolymers, polyvinyl acetate, polyvinyl butyral, carnauba wax, candelilla wax, Japan wax, beeswax, anhydrous lanolin wax, paraffin wax, microcrystalline wax, montan wax, earth wax, ceresin, petrolatum, vaseline, polyethylene wax, chlorinated paraffin, fatty acid amides, shellax wax, ethylene-vinyl acetate copolymers, ethylene-acrylate copolymers, ethylene-methacrylate copolymers and ionomer (Surlyn).

In a preferred embodiment of the present invention, a heat shrinkable plastic film can be disposed on the inner side of a metal layer via an adhesive layer.

Examples of plastics which can be used in this embodiment of the invention include the enumerated plastics for the outer layer. The thickness of the plastic film can be, for example, from 30 to 70 μm.

While adhesives for the adhesion layer can be appropriately varied depending upon the materials to be adhered, examples of such adhesives are a polyesterisocyanate two-part type adhesive and a polyacrylate two-part type adhesive. It is desirable that the adhesive be applied as coating on the inner film. This is because direct coating of the adhesive onto the metal layer is liable to inflict damage to the metal layer.

In a preferred embodiment of the present invention, an innermost layer can be composed of an insulating paint film (a coated layer). This coated insulating paint film is produced by applying materials which provide an electric resistance value after coating of from $10^4$ to infinity ($\infty$) [ohm].

The insulating ink compositions which can be used to form the insulating paint film are those containing materials such as phenolic resins, xylene resins, urea resins, melamine resins, ketone resins, coumarone-indene resins, petroleum resins, terpene resins, cyclized rubber resins, chlorinated rubber resins, alkyd resins, polyamide resins, acrylic resins, polyvinyl chloride, vinyl chloride-vinyl acetate copolymer resins, polyvinyl acetate, polyvinyl alcohol, polyvinyl butyral, chlorinated polypropylene, styrene resins, epoxy resins, polyurethane, and cellulose derivative resins. Such ink compositions are applied as coating to form an insulating paint film so that pinholes are not formed and so that an electric resistance value of at least $10^4 \Omega$ is obtained.

It is desirable that the thickness of the insulating paint film be from $1\mu$ to $40\mu$. If the thickness is less than $1\mu$, the electrical insulating properties may be poor. If the thickness is more than $40\mu$, it will be difficult to carry out coating.

The insulating paint film can be also produced by an extrusion coating method. Thermoplastic resins can be used in this extrusion coating method to produce the insulating paint film. Examples of such thermoplastic resins include polyethylene, polypropylene, polyvinyl chloride, polyvinylidene chloride, polystyrene, ethylene-acrylate copolymers, ethylene-methacrylate copolymers, ethylene-vinyl acetate copolymers, saponified ethylene-vinyl acetate copolymers, ethylene-α-olefin copolymer elastomers, acid-modified polyolefins, styrene-butadiene-acrylonitrile copolymers, polyamides, polycarbonates, polysulfones, polyacetals, polymethyl methacrylate, polyphenylene oxide, polyurethane, polyethylene terephthalate, and polybutadiene terephthalate.

Varnish compositions which can form the paint film are those obtained by dissolving, into a solvent or the like, a film-forming material selected from natural resins such as rosin, shellac, dammar gum, and copal; processed resins such as ester rubbers, limed rosin and maleic rosin; synthetic resins such as alkyd resins, butyrated aminoalkyd resins, phenolic resins, vinyl acetate resins, vinyl chloride resins, epoxy resins, acrylic resins (such as polyethyl methacrylate and polybutyl methacrylate), hydrocarbon resins, urethane resins, vinyl butyral resins, silicone resins, polyethylene, polyamides, vinyl chloride-vinyl acetate copolymers, chlorinated polypropylene, acrylpolyol (two-part system) and acrylpolyol-vinyl chloride-vinyl acetate (two-part system); cellulose derivatives such as nitrocellulose, acetylcellulose and acetylbutyrylcellulose; rubber derivatives such as chlorinated rubbers and cyclized rubbers; and other materials such as polyvinyl alcohol, carboxymethylcellulose, casein and soluble starch.

In a preferred embodiment of the present invention, a heat shrinkable plastic film can be used as an inner layer. Plastics which can be used in this embodiment include the enumerated plastics for the outer layer.

In a preferred embodiment of the present invention, a metal-depositing layer is interposed between an outer layer of heat shrinkable plastic film and an insulating inner layer.

This metal-deposited layer can be provided by forming a desired metal film on the surface of a layer to be coated by means of vacuum deposition. Metals which are used in a deposition step are not restricted, and various metals can be used. Examples of such metals are gold, silver, copper, lead, zinc, cadmium nickel, cobalt, tin, aluminum, magnesium, titanium, beryllium, lithium, gallium, selenium, tellurium, chromium, manganese, antimony and bismuth.

Figure 5:
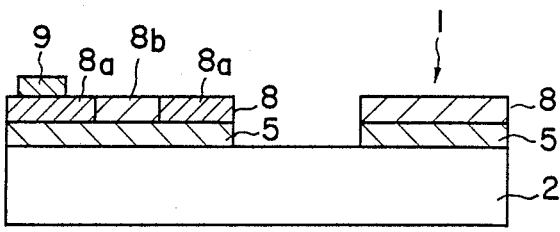
FIG. 5 is a longitudinal sectional view of a heat shrinkable wrapping film having a metal layer formed on a portion of the film.

Referring to FIG. 5, an example of a heat shrinkable wrapping film 1 having a partial metal thin film layer will be described.

In FIG. 5, reference numeral 2 designates a heat shrinkable plastic film; reference numeral 5 designates a metal thin film layer partially formed on one side of the heat shrinkable plastic film; and reference numeral 8 designates a protective layer which is provided by coating the surface of the metal thin film layer 5 with an ink composition. The protective layer 8 is formed from an acid or alkali resistant ink composition. The protective layer 8 may be formed from either a transparent ink composition or a pigmented ink composition. The protective layer 8 can be formed in an optional pattern (letters, and designs). For example, in FIG. 5, a protective layer 8b is printed and formed in desired letters and patterns with the use of the pigmented ink composition. A protective layer 8a is formed in desired patterns from the transparent ink composition. Thus, in the portion of the protective layer 8a formed from the transparent ink composition, metal gloss is seen therethrough. The portions consisting of the protective layer 8b formed from the pigmented ink composition in desired patterns and the protective layer 8a formed from the transparent ink composition exhibit desired patterns (letters and designs) in a metal gloss background. Reference numeral 9 designates a heat sealing layer optionally disposed on a portion of the surface of the protective layer 8. When it is possible to heat seal without any heat sealing layer 9, the heat sealing layer 9 is not necessarily provided.

Films of materials such as drawn polypropylene, drawn nylon, drawn polyethylene terephthalate, polyvinyl chloride, and drawn polyethylene can be used as the heat shrinkable plastic film 2 described above. Metals from which the metal thin film layer 5 is formed include aluminum, chromium and copper. Aluminum is ordinarily used. The acid or alkali resistant ink compositions from which the protective layer 8 is formed include ink compositions containing, as a vehicle, any of the following materials: vinyl chloride-vinyl acetate copolymers, nitrocellulose resins, urethane resins, saturated polyesters, polyamide resins, and acrylic resins. The heat sealing agents from which the heat sealing layer 9 is formed include ethylene-vinyl acetate copolymers, ethyl-acrylate copolymers, and a mixture of an ethylene-vinyl copolymer and chlorinated polypropylene.

A process for producing this heat shrinkable wrapping film 1 will now be described.

As shown in FIG. 5, the metal thin film 5 is first formed on the surface of the heat shrinkable film 2. The metal thin film 5 is formed by means of vacuum deposition, sputtering, ion plating or the like, and its thickness is ordinarily from 200 to 1,000 Å, preferably from 300 to 600 Å. An anchor layer can be interposed between the metal thin film 5 and the heat shrinkable film 2 as needed. The anchor layer can be formed from materials such as chlorinated rubbers, chlorinated polypropylene, nitrocellulose-acrylic resins, acrylic resins, urethane-acrylic resins, and acrylvinyl chloridevinyl acetate resins. The use of the anchor layer can inhibit a deposition blushing phenomenon during shrinkage.

The protective layer 8 is then formed on the metal thin film 5 from the acid or alkali resistant ink composition in a desired pattern. The protective layer 8 can be formed by means of printing processes such as gravure printing, silk screen printing and offset screen printing. It is preferable to form a protective layer 8 having a thickness of ordinarily from 1 to 10μ, particularly from 2 to 4μ. The heat sealing layer 9 is formed on the heat sealing portion of the protective layer 8 by a printing process as needed. After the protective layer 8 and the heat sealing layer 9 have been formed, the whole structure is immersed in an acidic or alkaline solution to carry out etching treatment. Thus, the metal thin film 5 of the portion provided with no protective layer 8 is removed, whereas the metal thin film 5 of the portion provided with the protective layer 8 remains as the partial metal thin film layer 5.

Examples of acidic solutions which can be used in the etching treatment described above are aqueous solutions of materials such as hydrochloric acid, sulfuric acid, nitric acid and phosphoric acid. It is preferable that the acidic aqueous solution be used in a concentration of from 0.25 to 10 normalities (N). Aqueous solutions of materials such as sodium hydroxide and ammonium hydroxide can be used as the alkali solutions. It is preferable that the alkaline aqueous solution be used in a concentration of from 0.1 to 10 normalities (N). After the etching treatment has been completed, the adhering/remaining acid or alkali is neutralized. Thereafter, the whole structure is washed with water and dried to obtain a heat shrinkable wrapping film 1 as shown in FIG. 5.

The packaging material of the present invention has at least an outer layer of a heat shrinkable plastic film and a laminate exhibiting metal gloss. The metal-deposited layer is laminated as needed. These layers are laminated by means of conventional methods such as application of anchoring agents and application of adhesives.

When the packaging material of the present invention is used in packaging of an article to be packaged, it is usually formed from a sheet-like material into tubings or tubes. Methods of laminating the sheet-like material into tubings or tubes include a high-frequency sealing method, a solvent bonding method, and a method wherein a solvent is used.

The adhesives which can be used in the lamination described above can be appropriately selected depending upon the materials to be bonded. Examples of such adhesives include a polyester-isocyanate two-part type adhesive and a polyacrylate two-part type adhesive.

Examples of adhesives which can be used in forming the tube include a polyester-isocyanate two-part type adhesive, ethyl acetate, methyl ethyl ketone (MEK), tetrahydrofuran (THF), n-hexane, toluene, methyl isobutyl ketone and xylene.

After the packaging material of the present invention has been formed into tubings or tubes, the body of a desired article to be packaged is placed therein. The package is then heated by suitable methods to heat shrink the packaging material, thereby to join it to the body. The resulting product can then be used. In heat shrinkage, it is desirable that the percent shrinkage of the packaging material be no more than 12%. This is because blushing can be completely prevented at a percent shrinkage of no more than 12%. When the packaging material according to the present invention is used, the appearance and metal gloss of the product is good even at a percent shrinkage of 15%.

EXAMPLES

This invention will now be described in greater detail by specific examples of practice thereof.

EXAMPLE 1

Specific designs and letters were printed as a pattern onto one side of a polyvinyl chloride (PVC) film 2 having a thickness of 70μ and a percent lateral shrinkage of 50% by using transparent red, silver and black type ink compositions 4a, 4b and 4c comprising the following components (NL-BI available from Moroboshi Ink, Japan).

|  | Percent by wt. |
|---|---|
| Transparent red ink composition: | |
| Pigment | 4 ~ 6 |
| Vinyl chloride-vinyl acetate resin | 4 ~ 6 |
| MMA (methyl methacrylate) | 11 ~ 14 |
| Organic solvents (toluene, ethyl acetate, MEK and IPA) | 81 ~ 74 |
| Silver ink composition: | |
| Aluminum paste | 10 ~ 15 |
| BMA (butyl methacrylate) | 15 ~ 20 |
| Nitrocellulose | 3 ~ 6 |
| Organic solvents (toluene, ethyl acetate and IPA) | 72 ~ 59 |
| Black ink composition: | |
| Carbon black | 10 ~ 13 |
| MMA | 12 ~ 16 |
| Nitrocellulose | 2 ~ 5 |
| Organic solvents (toluene, ethyl acetate and IPA) | 76 ~ 66 |

Two varnish compositions comprising the following components (NL-BI available from Moroboshi Ink, Japan) were sequentially applied onto the ink layers. The respective coating weights were about 2 g/m² (on a dry basis). Drying was amply carried out with hot air at 55° C. or below to form paint films 3a and 3b.

|  | Percent by wt. |
|---|---|
| Varnish Composition (1): | |
| EMA (ethyl methacrylate) | 20 ~ 30 |
| Organic solvent (toluene) | 80 ~ 70 |
| Varnish Composition (2): | |
| EMA | 10 ~ 15 |
| Nitrocellulose | 4 ~ 7 |
| Organic solvents (toluene, ethyl acetate and IPA) | 85.6 ~ 77 |
| PE wax | 0.4 ~ 1.0 |

A sheet 1 after resin paint film formation was longitudinally cut by means of a slitter and then combined in the form of a tube by means of a bag making machine to produce a tube for a dry cell jacket. The schematical partial sectional view of the resulting tube is shown in FIG. 1.

An alkaline dry cell was jacketed with this tube and the tube was heat shrunk in a shrink tunnel with hot air at 150° C.

Insulating properties and alkali resistance were imparted to the dry cell jacket by the resin paint film described above, and a dry cell label having desired metal gloss derived from the silver ink composition was obtained.

EXAMPLE 2

Specific designs and letters were printed in a pattern onto one side of a PVC film 2 having a thickness of 40μ and a percent lateral shrinkage of 50% by using the same ink compositions 4a, 4b and 4c as those described in Example 1.

Separately, an adhesive 6 (10:1 Takewrap A-369/Takenate A-19 available from Takeda Seiyaku, K.K., Japan) was applied to one side of a PVC film 3c having a thickness of 32μ and a percent lateral shrinkage of 50% and amply dried with hot air at 60° C. or below. The coating weight of the adhesive was from about 3 to 5 g/m² (on a dry basis).

Figure 2:
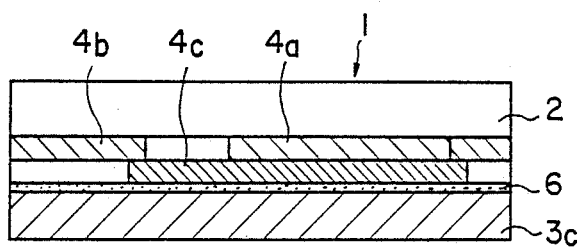

The PVC films 2 and 3c described above were laminated so that the ink layer of the compositions 4a, 4b and 4c of the PVC film 2 came into contact with the adhesive layer 6 of the PVC film 3c. Ageing was carried out at room temperature to cure the adhesive. A schematical partial sectional view of the resulting sheet 1 is shown in FIG. 2.

This sheet was longitudinally cut by means of a slitter and then combined in the form of a tube by a bag making machine to produce a tube for a dry cell jacket.

EXAMPLE 3

Predetermined designs and letters were printed as a pattern onto one side of a PVC film 2 having a thickness of 40μ and a percent lateral shrinkage of 55% by using transparent yellow, black and white type ink compositions 4a and 4b comprising the following components (VM-PS available from Dainichi Seika, Japan).

A heat-resistant anchor composition 7 for deposition comprising the following components (VM-GM available from Dainichi Seika, K.K., Japan) and a sealant primer comprising the following components (a waterless primer manufactured by Dainichi Seika K.K., Japan and marketed under the trade name VM) were then applied to specific portions of the printed surface. Aluminum was vacuum deposited on the thus treated film to form a metal-deposited layer 5 and was then washed with water to peel off the deposited layer which was disposed on the sealant primer-coated portions (sealant processing).

Ink composition:
  Nitrocellulose, acrylic resins, acrylates (MMA+BMA), solvents (ethyl acetate, IPA, n-propyl acetate, isobutanol and toluene)
Anchor composition for deposition:
  Chlorinated rubber, chlorinated polyolefin, and solvents (ethyl acetate and toluene)
Sealant primer:
  Poval, polyethylene, and solvents (water and methanol)

Separately, an adhesive 6 (10:2 Seikabond E-263/Seikabond C-26; Dainichi Seika K.K., Japan) was applied to a PVC film 3c having a thickness of 30μ and a percent lateral shrinkage of 55% and amply dried with hot air at 60° C. or below. The coating weight of the adhesive was from about 4 to 6 g/m² (on a dry basis).

Figure 3:
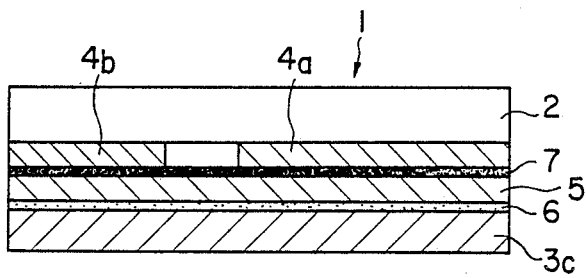

The two PVC films 2 and 3c described above were laminated so that the metal-deposited layer 5 came into contact with the adhesive layer 6, and ageing was carried out at room temperature to cure the adhesive. A schematical partial sectional view of the resulting sheet 1 is shown in FIG. 3.

This sheet was longitudinally cut by means of a slitter and then combined in the form of a tube by means of a bag making machine to produce a tube for a dry cell jacket.

A dry cell was jacketed with this tube and the tube was heat shrunk at a percent shrinkage within 5% by means of a shrink tunnel for deposition (manufactured by Nippon Jido Seiki, Japan).

The resulting dry cell jacket exhibited good appearance without any blushing of the deposited layer.

While poval was used as the sealant primer in this example, other materials such as carboxymethyl cellulose, cellulose acetate propionate, polyvinyl alcohol, polyvinyl pyrrolidone, methyl cellulose, and hydropropionate cellulose can be used in the present invention.

EXAMPLE 4

A PVC film 2 having a thickness of 40μ and a percent lateral shrinkage of 55% was subjected to the same printing as described in Example 3. Vacuum deposition and sealant processing were carried out in the same manner as described in Example 3.

Figure 4:
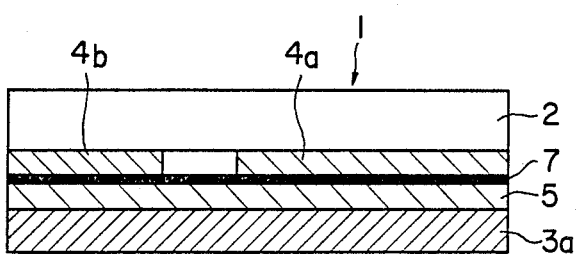

A varnish composition comprising the following components (VM-D Medium available from Dainichi Seika K.K., Japan) was applied twice to the metal-deposited surface 5, and amply dried with hot air at 60° C. or below to form a resin film 3a. The coating weight of the varnish composition was about 3 g/m² (on a dry basis). A schematical partial sectional view of the resulting sheet 1 is shown in FIG. 4.

Varnish composition:
 Vinyl chloride-acrylate resin (acrylate: MMA), solvents (toluene, and ethyl acetate), and curing agent.

This sheet was longitudinally cut by means of a slitter and then combined in the form of a tube by means of a bag making machine to form a tube for a dry cell jacket.

While chlorinated rubber and chlorinated polyolefin were used as he anchor 7 for deposition in Examples 3 and 4, other anchors such as nitrocellulose-acrylic systems, acrylic systems, urethane-acrylic systems, nitrocellulose-acrylic-polyol systems (two-part type) and acrylic-vinyl chloride-vinyl acetate systems can be used in the present invention.

EXAMPLES 5 THROUGH 16

A concrete process for producing a packaging material will be described in representative Example 7.

PROCESS OF EXAMPLE 7

A VS ink composition manufactured by Dainichi Seika is applied twice to a heat shrinkable vinyl chloride film manufactured by Mitsubishi Resin (Hishirex 502Y) (40μ) to carry out backing printing by means of a gravure plate having a depth of 40μ. A chlorinated rubber primer is coated thereon twice by means of a gravure plate having a depth of 40μ. Aluminum is deposited on the rubber primer surface to a thickness of 500 Å to form a laminate "A".

An adhesive (one obtained by mixing Takerak A-540 with Takenate A-50 in a ratio of 8:1 both being manufactured by Takeda Yakuhin, Japan, and diluting with ethyl acetate) was uniformly coated on another PVC film (Hishirex 502Y) (40μ) in a coating weight of 5 g/m² (on a dry basis) to form a laminate "B".

The laminates "A" and "B" were then laminated to prepare a packaging material of Example 7. The packaging material was then combined in the form of a tube so that the ink surface was an outer surface. Tests were carried out by varying the percent shrinkage.

As shown in the following Table 1, packaging materials of Examples 5 through 9 and Comparative Examples 1 and 2 were evaluated in the same manner as described above. The results are shown in Table 1.

Packaging materials having layer structures and layer thicknesses as shown in Table 2 were produced in the same manner as described in Example 7.

TABLE 1

| No. | Layer Structures and Layer Thicknesses | Evaluation 3% | 5% | 10% | 15% |
|---|---|---|---|---|---|
| Example 5 | Shrinkable vinyl chloride 40μ/chlorinated rubber P 1μ/chlorinated rubber P 1μ/deposited aluminum 500 Å | Good | Good | Good | Good |
| Example 6 | Shrinkable vinyl chloride 40μ/ink/ink/chlorinated rubber P 1μ/chlorinated rubber P 1μ/deposited aluminum 500 Å | Good | Good | Good | Good |
| Example 7 | Shrinkable vinyl chloride 40μ/ink/ink/chlorinated rubber P 1μ/chlorinated rubber 1μ/deposited aluminum 500 Å/adhesive layer/shrinkable vinyl chloride 40μ | Good | Good | Good | Good |
| Example 8 | Shrinkable vinyl chloride 40μ/ink/ink/chlorinated rubber P 1μ/block copolymer rubber P/deposited aluminum 500 Å/adhesive layer/shrinkable vinyl chloride 40μ | Good | Good | Good | Fair |
| Comparative Example 1 | Shrinkable vinyl chloride 40μ/ink/deposited aluminum 500 Å | Poor | Poor | Poor | Poor |
| Comparative Example 2 | Shrinkable vinyl chloride 40μ/deposited aluminum 500 Å/adhesive layer/shrinkable vinyl chloride 40μ | Poor | Poor | Poor | Poor |
| Example 9 | Shrinkable vinyl chloride 40μ/chlorinated rubber P 1μ/ink/deposited aluminum 500 Å/adhesive layer/shrinkable vinyl chloride 40μ | Fair | Poor | Poor | Poor |

Note:
P: Primer
Ink: VS ink manufactured by Dainichi Seika Kogyo, K.K., Japan
Adhesive layer: Adhesive (8:1 Takerak A540/Takenate A50 manufactured by Takeda Seiyaku, Japan)
Shrinkable vinyl chloride: Hishirex 502 available from Mitsubishi Resin, Japan Evaluation was carried out by setting the present shrinkage at 3%, 5%, 10% and 15%, passing the packaging materials through a hot open tunnel at 100° C. and observing visually metal gloss at their surfaces.

TABLE 2

| No. | Layer Structures and Layer Thicknesses |
|---|---|
| Comparative Example 3 | Shrinkable vinyl chloride 40μ/ink/ink/deposited aluminum 400 Å/heat bonding resin 4 g/m² |

TABLE 2-continued

| No. | Layer Structures and Layer Thicknesses |
|---|---|
| Example 10 | Shrinkable vinyl chloride 40μ/ink/ink/chlorinated rubber P 3 g/m²/deposited aluminum 400 Å/adhesive 3 g/m²/shrinkable vinyl chloride 40μ |
| Example 11 | Shrinkable vinyl chloride 40μ/ink/ink/cyclized rubber P 3 g/m²/deposited aluminum 400 Å/insulating paint film 4 g/m² |
| Example 12 | Shrinkable vinyl chloride 40μ/ink/ink/cyclized rubber P 1.5 g/m²/chlorinated rubber P1.5 g/m²/deposited aluminum 400 Å/heat bonding resin 4 g/m² |
| Example 13 | Shrinkable vinyl chloride 40μ/ink/ink/cyclized rubber P 1.5 g/m²/chlorinated rubber P 1.5 g/m²/deposited aluminum 400 Å/adhesive 3 g/m²/shrinkable vinyl chloride 40μ |
| Example 14 | Shrinkable vinyl chloride 40μ/ink/ink/cyclized rubber P 1.5 g/m²/chlorinated rubber P 1.5 g/m²/deposited aluminum 400 Å/insulating paint film 4 g/m² |
| Example 15 | Shrinkable vinyl chloride 40μ/ink/ink/chlorinated rubber P 1.0 g/m²/cyclized rubber P 1.0 g/m²/chlorinated rubber P 1.0 g/m²/deposited aluminum 400 Å/heat bonding resin 4 g/m² |
| Example 16 | Shrinkable vinyl chloride 40μ/ink/ink/chlorinated rubber P 1.0 g/m²/cyclized rubber P 1.0 g/m²/deposited aluminum 400 Å/adhesive 3 g/m²/shrinkable vinyl chloride 40μ |

Note:
Abbreviations used in Table 2 are the same as those used in Table 1.
Deposited aluminum: The whole surface was deposited.
Primer coating process: It was in-line coated by gravure printing.
Adhesive: Adhesive (15:1 Takerak A2070/Takenate A-3) manufactured by Takeda Yakuhin, Japan was coated on a shrinkable vinyl chloride inner layer, and the coated layer was laminated.
Heat bonding resin: Daiyakaruna PA 30B (m.p. 72°~76° C.) manufactured by Mitsubishi Kasei was hot melt to coat.
Insulating paint film: Vinyl chloride-vinyl acetate resin (VAGH available from UCC) was gravure coated.

The packaging materials shown in Table 2 were used and tubes were formed from the packaging materials by means of high-frequency sealing so that the percent shrinkage was 3%, 5%, 8% and 12%. Each unit dry cell was placed in a respective tube and each tube was heat shrunk in an oven at 80° C. The adhesion properties and metal gloss properties of these tubes were measured. The results are shown in Tables 3a and 3b.

The adhesion properties were determined by measuring adhesion strength. The metal gloss properties were measured by the following two methods. In one method, samples were cut off from the dry cells, and their metal gloss properties were measured at an angle of 60° by means of a glossmeter manufactured by Suga Shikenki, Japan. In another method, the metal gloss properties were determined by visually observing the samples.

TABLE 3a

| | Gloss Value | | | | | |
|---|---|---|---|---|---|---|
| | Percent Shrinkage | | | | | |
| No. | 0% | 3% | 5% | 8% | 12% | Evaluation |
| Comparative Example 3 | 840 | 320 | 320 | 300 | 250 | Very poor |
| Example 10 | 820 | 460 | 400 | 400 | 400 | Fair |
| Example 11 | 830 | 430 | 400 | 310 | 320 | Fair |
| Example 12 | 830 | 830 | 820 | 810 | 800 | Very good |
| Example 13 | 830 | 830 | 820 | 810 | 800 | Very good |
| Example 14 | 830 | 830 | 820 | 810 | 800 | Very good |
| Example 15 | 720 | 620 | 560 | 530 | 520 | Good |
| Example 16 | 830 | 720 | 700 | 610 | 620 | Good |

TABLE 3b

| | Visual Observation | | | | | |
|---|---|---|---|---|---|---|
| | Percent Shrinkage | | | | | |
| No. | 0% | 3% | 5% | 8% | 12% | Evaluation |
| Comparative Example 3 | Very good | Poor | Very poor | Very poor | Very poor | Very poor |
| Example 10 | Very good | Fair | Bad | Bad | Bad | Fair |
| Example 11 | Very good | Moderate | Bad | Very bad | Very bad | Fair |
| Example 12 | Very good | Very good | Very good | Very good | Very good or good | Very good |
| Example 13 | Very good | Very good | Very good | Very good | Very good or good | Very good |
| Example 14 | Very good | Very good | Very good | Very good | Very good or good | Very good |
| Example 15 | Good | Fair | Fair | Fair | Fair | Good |
| Example 16 | Very good | Good | Good | Fair | Fair | Good |

As can be seen from Tables 1, 3a and 3b, blushing after heat shrinkage can be prevented or reduced by using the anti-blushing primer layer according to the present invention.

When the anti-blushing primer layer is composed of a multi-layer structure (Examples 5 through 8, and 12 through 16), particularly a bilayer structure consisting of an outer cyclized rubber primer layer and an inner chlorinated rubber primer layer (Examples 12 through 14), it has been found that a very good anti-blushing effect be achieved.

What is claimed is:

1. A packaging material comprising:
    (a) an outer layer of a heat shrinkable plastic film and;
    (b) a metallic glossy laminate disposed on an inner side of said outer layer and which maintains metallic gloss even after heat shrinkage, and said laminate comprises an anti-blushing primer layer disposed on the inner side of said outer layer and a metal-deposited layer disposed on said primer layer.

2. The packaging material according to claim 1 which has an ink layer interposed between said film and said anti-blushing primer layer.

3. The packaging material according to claim 1 wherein a heat bonding resin layer is disposed on the inner side of said metal-deposited layer.

4. The packaging material according to claim 1 wherein a heat shrinkable plastic film is disposed on the inner side of said metal-deposited layer via an adhesive layer.

5. The packaging material according to claim 1 wherein an insulating paint film is disposed on the inner surface of said metal-deposited layer.

6. The packaging material according to claim 1 wherein said metallic glossy laminate comprises a metal-deposited layer partially formed on the inner side of said film and a protective layer of an acid or alkali resistant ink composition formed by coating the inner surface of said metal layer.

7. The packaging material according to claim 1 wherein a rubber primer is used as said anti-blushing primer layer.

8. The packaging material according to claim 1 wherein said anti-blushing primer layer comprises a bilayer structure of the same or different rubber primers.

9. The packaging material according to claim 8 wherein said rubber primer bilayer structure comprises an outer cyclized rubber primer layer and an inner chlorinated rubber primer layer.

* * * * *